Patented Jan. 29, 1929.

1,700,367

UNITED STATES PATENT OFFICE.

ANDREW J. FLEITER, OF AKRON, OHIO, ASSIGNOR TO THE AKRON STANDARD MOLD COMPANY, OF AKRON, OHIO, A CORPORATION OF OHIO.

LOCKING MECHANISM FOR VULCANIZERS.

Application filed February 13, 1926, Serial No. 88,035. Renewed June 26, 1928.

This invention relates specifically to vulcanizers of the type known in the trade as "watchcase" vulcanizers, in which there is provided a centrally located, stationary vulcanizer section having formed in its two faces a partial cavity for the molding of tire casings, although certain features thereof may be used with other vulcanizers. Against the stationary section of the vulcanizer are arranged to swing two movable mold sections which complete the two mold cavities. The mold sections are arranged to be heated by steam, or other heating medium, which is circulated through the hollow or chambered mold sections.

The invention relates particularly to the mechanism for locking or unlocking the vulcanizer, with which is associated a rotatable locking ring having cam surfaces adapted to interlock with corresponding cam surfaces on the movable mold sections, and thus draw the sections tightly together. With the locking ring is associated a power-operated mechanism, such, for example, as a pneumatic or hydraulic cylinder which normally rotates the locking ring. It is found, however, that the rings will often-times stick or "freeze" and the invention provides for an auxiliary means for starting the ring. This means may also be used for giving a final locking turn to the ring.

The invention will be understood from the description and drawings, but it will be evident that changes and modifications may be made in specific embodiments of the invention within the scope of the claims hereof.

In the drawings:

Figure 3 is a horizontal section on the line 3—3 of Figure 2.

Figure 1:
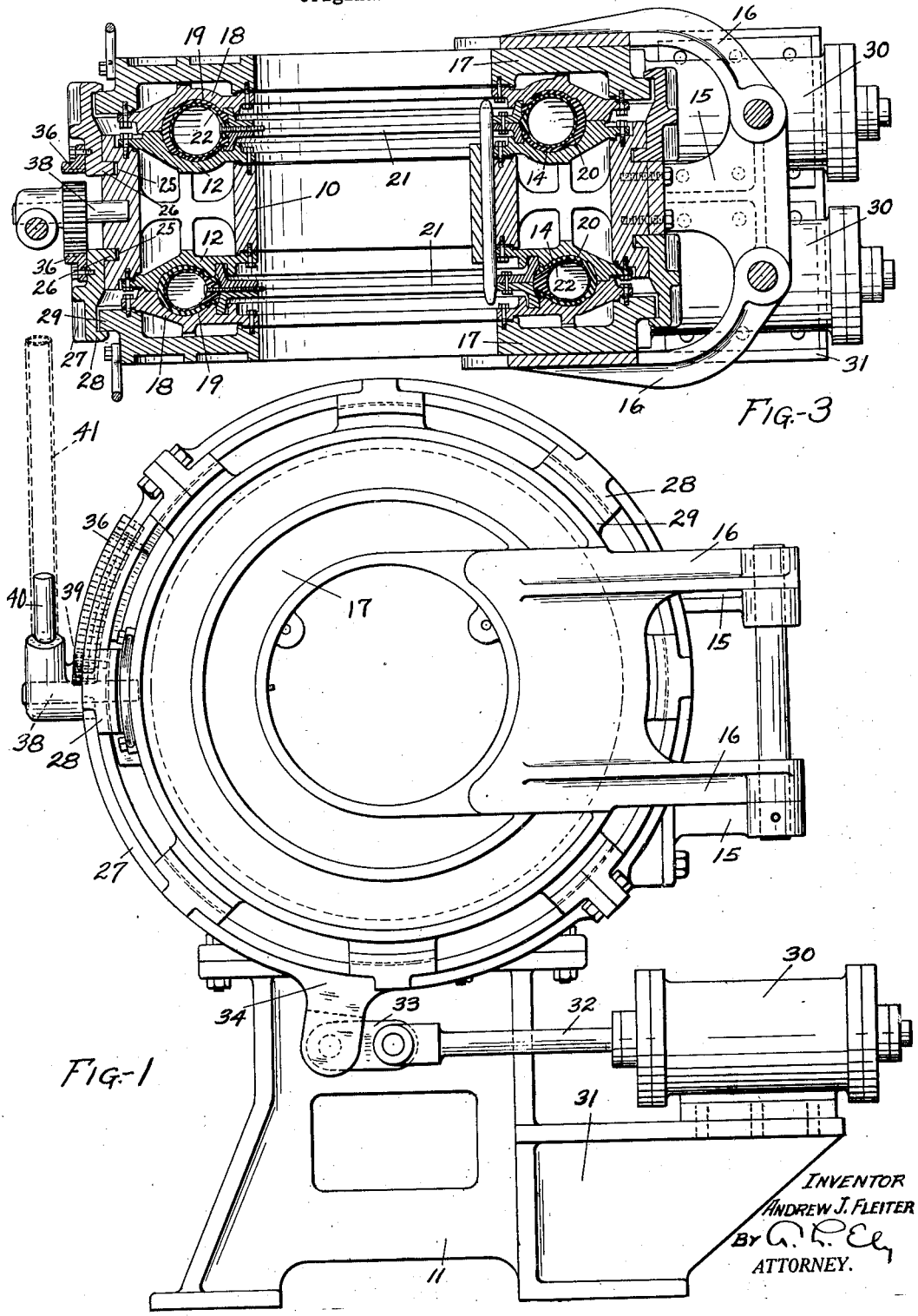
Figure 1 is a side elevation of a vulcanizer of the form described, having the invention applied thereto.
Figure 2:
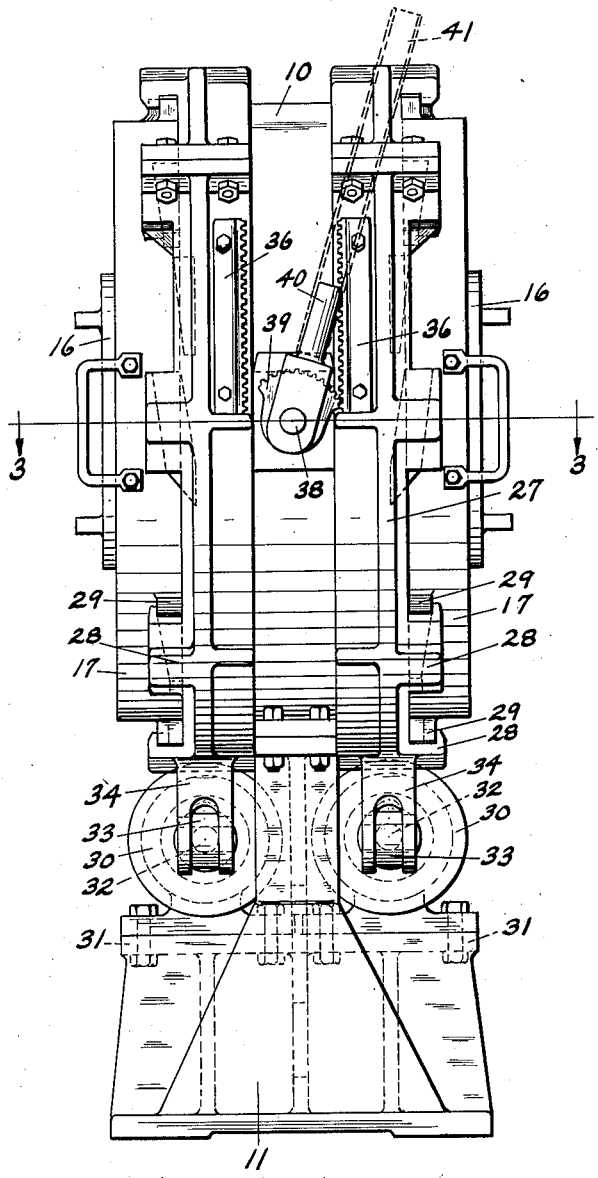
Figure 2 is an end or edge view thereof.

The apparatus comprises a central or stationary vulcanizer section which is indicated by the numeral 10, which section is supported upon a standard or base 11. The section is chambered for the circulation of the heating medium and to its faces are secured the mold plates 12, in which the sectional tire molding cavities 14 are formed.

At the rear of the central section are formed brackets 15, upon which are hingedly mounted swinging arms 16, on the extremities of which are carried the movable, chamber vulcanizer sections 17. On the faces of the movable sections are secured mold plates 18 formed with tire molding cavities 19 which cooperate with the cavities 14 to receive the tires 20, which are carried upon the usual supporting and centering rings 21 and air bags 22.

The means for locking the movable sections to the stationary or central section will now be described, but as both are the same, a description of one only will be given.

About the outer periphery of the stationary section is formed a channel 25 in which is received the inwardly turned flange 26 of the rotatable locking ring 27. This locking ring is formed with a plurality of angularly arranged lugs 28 which overhang lugs 29 formed upon the swinging vulcanizer sections 17. The surfaces of each pair of mating lugs 28 and 29 are provided with cam surfaces which are brought into contact upon the rotation of the ring 27, the cams or inclined surfaces thus forcing the swinging section against the stationary section and tightly clamping them.

The rings are rotated toward and from locking position by any suitable mechanical or power-operated means, the particular means illustrated herein being hydraulic or pneumatic cylinders 30 which are carried upon brackets 31 formed on the standard 11. Piston 32, located within each cylinder, is connected by a link 33 with a lug 34 extending from a ring 27.

The above described mechanism is usually sufficient to lock and unlock the molds, but the parts sometimes "freeze" or stick and it is necessary to provide an auxiliary device for starting the ring, and this device may be used for securing a slight additional or supplementary locking action.

Each ring 27 has secured to its outer circumference a curved rack 36, the racks facing one another, and between the racks upon the central or stationary section is located a pin 38 upon which is mounted a mutilated gear or half pinion 39 which is adapted to mesh with either rack 36. The hub of the pinion is provided with an operating extension 40, over which a hollow lever 41 may be placed, by which the pinion and the locking rings are rotated, the operation of the locking rings being selective.

It will be understood that other means than the cylinder and other auxiliary means than the racks and pinions may be provided for the purpose of actuating the locking rings, the principal feature of the invention being the provision of mechanical and auxiliary manually-operated locking mechanism for rotating the clamping ring.

What is claimed is:

1. In a vulcanizer of the "watchcase" type in which there is provided a stationary mold section and swinging mold sections adapted to be located against the stationary section, a locking ring for holding a swinging section clamped in position, a fluid operated device, and auxiliary manually operable means for rotating said locking ring.

2. In a vulcanizer, a stationary mold section and a movable mold section adapted to be located against the stationary section, a locking ring located upon one of the sections, mating cam surfaces upon the other section and upon the ring, a power operated device, and auxiliary manually operable means for rotating the ring.

3. In a vulcanizer, a stationary mold section and a movable mold section adapted to be located against the stationary section, a locking ring located upon one of the sections, mating cam surfaces upon the other section and upon the ring, a fluid operated device for operating the ring, and an auxiliary manually operated means therefor, comprising a rack upon the ring and a pinion rotatably mounted upon the stationary section.

4. In a vulcanizer, a stationary mold section and movable mold sections on either side thereof, rotatable rings mounted upon the stationary mold section, mating cam surfaces upon the movable sections and the rings, a rack on each ring, the racks facing one another, and a mutilated gear between said racks and adapted to mesh therewith selectively.

5. In a vulcanizer, a stationary mold section and movable mold sections on either side thereof, rotatable rings mounted upon the stationary mold section, mating cam surfaces upon the movable sections and the rings, a rack on each ring, the racks facing one another, a mutilated gear between said racks and adapted to mesh therewith selectively, and independent power operated means for moving the rings.

6. In a vulcanizer, a stationary mold section and movable mold sections on either side thereof, rotatable rings mounted upon the stationary mold section, mating cam surfaces upon the movable sections and the rings, a rack on each ring, the racks facing one another, a mutilated gear between said racks and adapted to mesh therewith selectively, and a fluid operated cylinder connected to each ring.

7. In a vulcanizer, a stationary mold section and movable mold sections on either side thereof, rotatable rings mounted upon the stationary mold section, mating cam surfaces upon the movable sections and the rings, a rack on each ring, and a single manually operated gear means to operate each ring selectively.

8. In a vulcanizer, a stationary mold section and movable mold sections on either side thereof, rotatable rings mounted upon the stationary mold section, mating cam surfaces upon the movable sections and the rings, a rack on each ring, manually operated gear means to operate each ring selectively, and independent power operated means for moving the rings.

9. In a vulcanizer, a stationary mold section and movable mold sections on either side thereof, rotatable rings mounted upon the stationary mold section, mating cam surfaces upon the movable sections and the rings, a rack on each ring, manually operated gear means to operate each ring selectively, and a fluid operated cylinder connected to each ring.

ANDREW J. FLEITER.